BAIERLE, HARTMANN, & REESE.
Refrigerator Building.

No. 78,507.  Patented June 2, 1868.

Witnesses:

Inventors:
A. Baierle
P. Hartmann
P. Reese

United States Patent Office.

ADAM BAIERLE, FREDERECK HARTMANN, AND FRIEDERICH REESE, OF CHICAGO, ILLINOIS.

Letters Patent No. 78,507, dated June 2, 1868.

IMPROVEMENT IN ICE-HOUSE FOR BREWERS AND BUTCHERS.

The Schedule referred to in these Letters Patent and making part of the same.

TO ALL WHOM IT MAY CONCERN:

Be it known that we, ADAM BAIERLE, FREDERECK HARTMANN, and FRIEDERICH REESE, all of Chicago, in the county of Cook, and State of Illinois, have invented new and useful Improvements in "Ice-Houses for Brewers and Butchers;" and we do hereby declare that the following is a full and exact description thereof, reference being had to the accompanying drawing, making part of this specification, in which—

Figure 1:
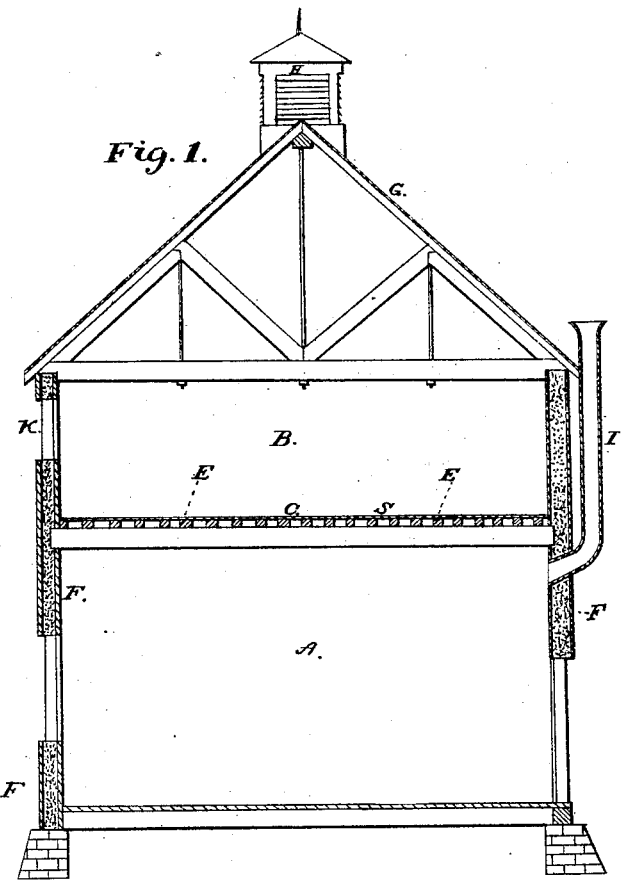

Figure 1 represents the sectional view of the building, and

Figure 2:
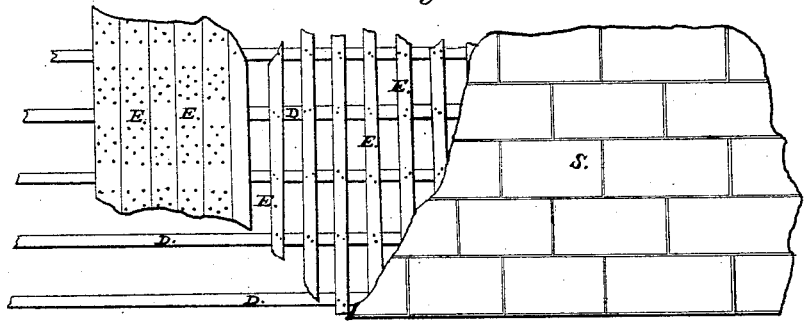

Figure 2 the plan of the floor.

The object of our invention being to provide cheap and efficient means for brewers and butchers to preserve their beer or meat, its nature consists in disposing over or above the vault or store-room an ice-house, having its floor so constructed as to produce a cooling effect on the beverage or meat kept in said vaults or store-rooms.

To enable others skilled in the art to make and use our invention, we will proceed to describe its construction and operation.

A is a vault or store-room.

B is an ice-house.

C is a floor, separating the two stories, and consisting of ordinary wooden joists D D, and a flooring of narrow planks, E, said planks being spaced when laid down, and nailed, or they may be perforated and laid tight.

S is a sheeting, with which said planks are covered, consisting of sheets of tin, galvanized sheet iron, or zinc, the sheets being seamed and soldered together, and arranged so as to break joints.

The walls F of the ice-house are double, filled with tan-bark, dust, or other suitable material, and the pointed roof G, covering the ice-house, is provided with ventilators H H.

There are flues I I coming from the vault or store-room, carried sufficiently high to discharge the deleterious air from those rooms.

The ice-house is provided with necessary opening or openings, K, to put the ice in, and the lower story is provided with necessary number of windows.

When the ice-house is filled with ice, the cold air, passing through the sheeting S, and the spaces between planks and joists, produces a cooling effect upon the beverage or meat stored in the story A.

What we claim as new and useful, in regard to the effect obtained, and the cheapness with which such an ice-house may be combined with vault or store-room, and desire to secure by Letters Patent, is—

A building for preserving meats, beer, and similar articles, consisting of the ice-chamber B and cooling-vault A, provided with one or more ventilators I, all constructed and arranged substantially as shown and described.

ADAM BAIERLE,
FREDERECK HARTMANN,
FRIEDERICH REESE.

Witnesses:
J. B. TURCHIN,
O. BEARDSLEE.